United States Patent [19]

Takagi et al.

[11] 4,094,292
[45] June 13, 1978

[54] HOT STARTER SYSTEM FOR ENGINES

[75] Inventors: Tadao Takagi, Saitama; Toru Yagi, Tokyo; Mitsuo Ehara, Saitama; Tatsumi Yamada, Tokyo, all of Japan

[73] Assignee: Honda Giken Kogyo Kabushiki Kaisha, Tokyo, Japan

[21] Appl. No.: 770,903

[22] Filed: Feb. 22, 1977

[30] Foreign Application Priority Data

Feb. 25, 1976 Japan .............................. 51-20427[U]

[51] Int. Cl.² ............................................ F02M 23/04
[52] U.S. Cl. ........................... 123/179 G; 123/124 A; 123/124 B; 123/32 EG
[58] Field of Search ........... 123/124 R, 124 A, 124 B, 123/179 G, 179 R, 119 D, 119 DB, 179 L, 32 EG

[56] References Cited

U.S. PATENT DOCUMENTS

| 2,230,184 | 1/1941 | Horton | 123/179 G |
|---|---|---|---|
| 3,043,286 | 7/1962 | Blomberg | 123/124 B |
| 3,353,801 | 11/1967 | Sarto | 123/179 G |
| 3,587,553 | 6/1971 | Sutton | 123/179 G |
| 3,866,588 | 2/1975 | Nakada et al. | 123/124 R |
| 3,977,380 | 8/1976 | Atsumi et al. | 123/179 G |

Primary Examiner—Wendell E. Burns
Attorney, Agent, or Firm—Lyon & Lyon

[57] ABSTRACT

A starter system for a hot internal combustion engine, the starter system including a first valve which opens upon starting of the engine in a heated state to permit supplemental air to be drawn into the engine intake passage to dilute the air-fuel mixture therein, and a second valve down stream of the first valve arranged to cut off supplemental air flow as vacuum pressure corresponding to complete firing of the engine develops in the intake passage.

8 Claims, 4 Drawing Figures

HOT STARTER SYSTEM FOR ENGINES

When an internal combustion engine is stopped while in a hot condition, because of the high temperature, there exists vaporized fuel adhering to the walls of the intake passage. Also, fuel is introduced into the intake passage from the float chamber through the nozzle by percolation. As a consequence, when the engine is started under "high temperature" condition, the mixture supplied to the engine is over-rich, with poor ignitability, and with the result that the engine is hard to start.

In order to eliminate such defect, conventional engine systems have been proposed wherein hot starting of the engine causes a control valve to introduce air into the intake passage at a location downstream of the throttle valve, so as to dilute the mixture. However, this approach has the disadvantage that dilution of the mixture continues after complete firing of the engine, thereby causing the engine to misfire, and generate increased harmful fuel components such as HC, etc., in the exhaust. Also, the engine becomes unstable and again hard to start.

It is a primary object of the present invention to overcome the difficulties encountered upon starting of an internal combustion engine under conditions of excess heat; more particularly, to provide a first, high temperature responsive valve which introduces supplementary air to dilute the mixture; and a second valve for cutting off the supplementary air at the time of complete firing of the engine.

Other and more detailed objects and advantages will appear hereinafter.

Figure 1:
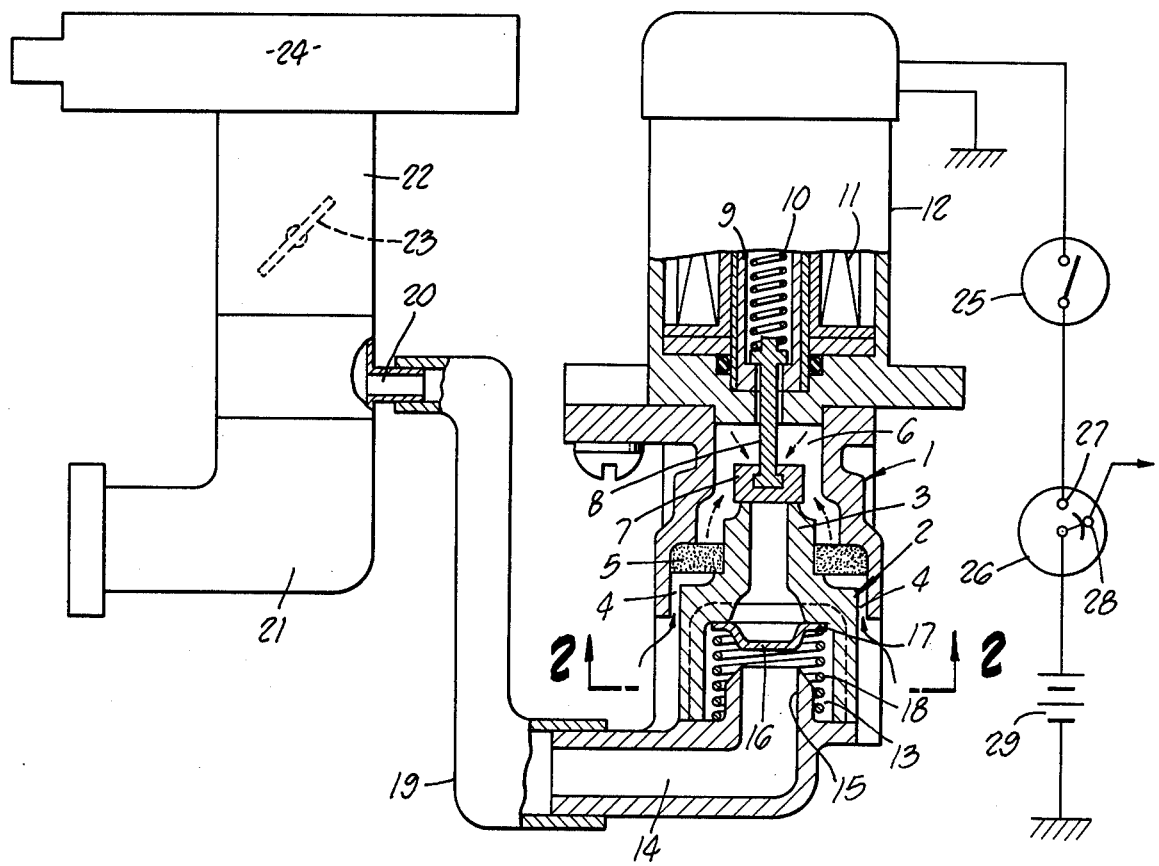
FIG. 1 is a partial side view, partial sectional view showing an embodiment of the hot starter system for engines shown connected to an intake passage extending from a carburetor and air cleaner, the starter system being shown in its closed position.
Figure 2:
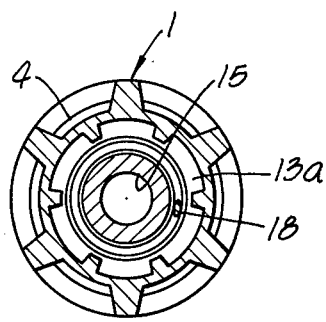
FIG. 2 is a transverse sectional view taken through 2—2 of FIG. 1.

The hot starter system for engines includes a tubular valve housing 1, the lower end of which receives an upwardly directed core 2, its upper end being reduced in diameter and forming an outlet stem 3. The core 2 and valve housing 1 form a ring of inlet passages 4 which join to form a common passage. In this region, the valve housing 1 and core 2 support therebetween a filter ring 5. The upper portion of the valve housing 1 forms an upper valve chamber 6 surrounding the outlet stem 3.

The upper end of the outlet stem 3 forms a valve seat which is engaged by a first control valve 7 having an upwardly directed stem 8, the upper end of which is received in a solenoid armature 9. The stem 8 is slidable in the solenoid armature 9 and is held in its lower position therein by a spring 10. Surrounding the armature 9 is a solenoid coil 11 encased in a solenoid housing 12.

The lower portion of the core 2 forms a lower valve chamber 13 which is connected to an air induction passage 14 including an upwardly directed portion 15 which terminates in an upwardly directed valve seat engaged by a second control valve 16. The second control valve 16 includes a flange 17 which engages a valve seat formed at the lower end of the outlet stem 3. A spring 18 surrounding the upwardly directed portion 15 of the air induction passage 14 urges the second control valve 16 upwardly against the lower end of the outlet stem 3. The lower valve chamber 13 is provided with internal channels 13a which permit flow around the flange 17.

The air induction passage 14 is connected to an air induction line 19, connected by an air inlet tube 20 to an air-fuel intake passage 21, appropriately connected to the engine (not shown). The passage 21 is connected at its intake end to a carburetor 22 having a throttle valve 23 which in turn is connected to an air cleaner 24.

The solenoid coil 11 which operates the upper or first control valve 7 is connected to a water temperature detecting switch 25 which in turn is connected to an ignition switch assembly 26 having a switch 27 for an engine starting circuit, not shown, and a switch 28 for an engine ignition circuit, not shown. The ignition switch assembly 26 is connected to a power source such as a battery 29 and the electric circuit is completed through conventional ground connections.

Operation of the hot starter system for engines is as follows. The water temperature detecting switch 25 is arranged to close, for example, at a water temperature of 50° C or higher. Assuming a temperature lower than 50° C, closure of the starter switch 27 does not complete a circuit through the solenoid coil 11 so that the first control valve 7 remains closed.

Figure 3:
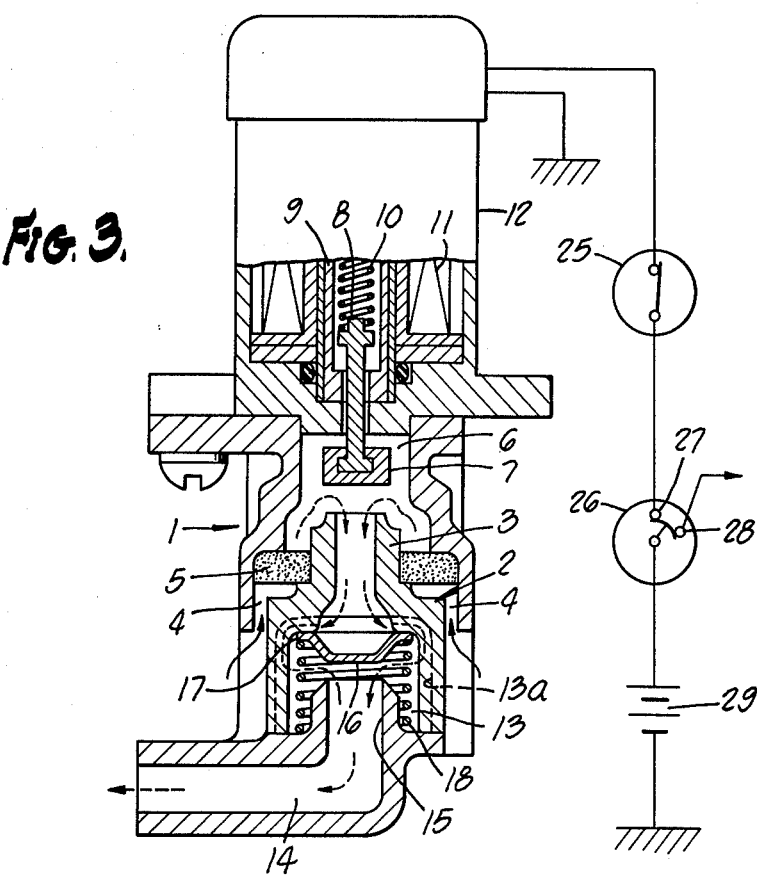
FIG. 3 is a partial side view, partial sectional view corresponding to FIG. 1 but showing the starter system in the course of supplying supplemental air to the intake passage.
Figure 4:
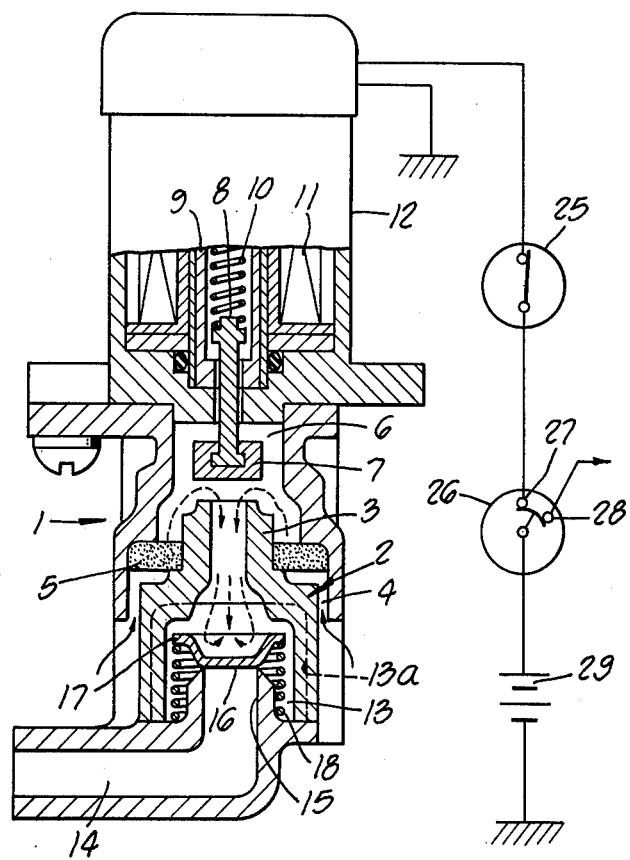
FIG. 4 is a partial side view, partial sectional view corresponding to FIGS. 1 and 3 showing the starter system as flow to the intake passage is closed off.

Assuming that the water temperature is above 50° C, the water temperature detecting switch 25 is closed; therefore, when the starter switch 27 is closed, the solenoid coil 11 is energized causing the first control valve 7 to raise as shown in FIG. 3 so that the air may enter the upper valve chamber 6 and pass outwardly therefrom around the second control valve 16 and into the air induction line 19 and the intake passage 21, thereby diluting the otherwise over-rich mixture in the intake passage 21. As the engine starts to function, a vacuum pressure is created in the intake passage 21 and air induction line 19. The vacuum pressure in the intake passage 21 on complete firing of the engine causes the second control valve 16 to oppose the spring 18 and seat shutting off the flow of supplementary air so that the engine now operates under its normal conditions.

Having fully described our invention, it is to be understood that we are not to be limited to the details herein set forth, but that our invention is of the full scope of the appended claims.

We claim:

1. A starter means for internal combustion engines in a heated state and of the type having an air-fuel mixture intake passage downstream of a throttle valve provided in a carburetor, the starter means comprising: means forming a supplemental air induction passage communicating with the intake passage; a normally closed first valve for controlling flow of the supplemental air into the induction passage; a heat responsive means for opening the first valve to permit flow of supplemental air through the induction passage to the intake passage on starting of the engine, thereby reducing the richness of the air-fuel mixture therein; and a normally open second valve interposed in the induction passage, the second valve being movable toward a closed position in response to vacuum intensity in the intake passage on complete firing of the engine, thereby to reduce and close off flow of supplemental air through the induction passage to the intake passage, as the richness of the air-fuel mixture therein is reduced.

2. A starter means for internal combustion engines in a heated state, as defined in claim 1, in which the internal combustion engine includes a starter switch, and wherein: the first valve is a solenoid valve; and the heat responsive means includes a switch electrically connecting the solenoid valve to the starter switch when the internal combustion engine is heated beyond a predetermined temperature, thereby to open the first valve.

3. A starter means for internal combustion engines in the heated state, as defined in claim 1, wherein: the induction passage includes a bypass around the second valve, a valve seat downstream of the second valve toward which the second valve is moved by vacuum intensity in the intake passage, and a spring urging the second valve away from its valve seat, the spring being yieldable to increased vacuum intensity in the intake passage to permit movement of the second valve toward its valve seat, thereby to throttle flow of supplemental air.

4. A starter means for internal combustion engines when heated above a preselected temperature, the engine having an air-flow mixture intake passage tending to have, when the engine is stopped and heated above said temperature, an over rich air-fuel mixture, the starter means comprising: a first valve means responsive to said preselected temperature on starting of the engine for supplying supplemental air to the air-fuel mixture intake passage, thereby to dilute the over rich air-fuel mixture therein; and a second valve means responsive to complete firing of the engine, to shut off the supplemental air to the air-fuel mixture intake passage.

5. A starter means, as defined in claim 4, wherein: means forming a housing structure includes a first valve chamber for the first valve means and a second valve chamber for the second valve means which are disposed in tandem; and a supplemental air induction passage extends from the second valve chamber to the intake passage.

6. A starter means, as defined in claim 4, wherein: the first valve means includes a solenoid, and a temperature sensitive switch.

7. A starter means, as defined in claim 6, wherein: the second valve includes a valve element, a valve seat disposed downstream thereof, and a spring urging the valve element from the valve seat to permit flow of supplemental air; and the valve element being responsive to increased vacuum intensity in the intake passage upon complete firing of the engine, to oppose the spring and engage the valve seat and close off further flow of supplemental air.

8. A starter means for internal combustion engines, when heated above a preselected temperature, the engine having a starter switch, and an air-fuel mixture intake passage tending to have, when the engine is heated and stopped, an over rich air-fuel mixture, the starter means comprising: a valve housing structure defining a first chamber having an inlet and a first valve seat forming a first outlet, and a second chamber having an inlet communicating with the first outlet, and a second valve seat forming a second outlet; a first valve engagable with the first valve seat; a second valve engagable with the second valve seat; a supplemental air induction passage connecting the second outlet and the engine intake passage; a spring urging the second valve from the second seat; a starter switch operated means responsive to a preselected temperature, to cause unseating of the first valve and flow of supplemental air to the intake passage thereby to dilute the over rich air-fuel mixture therein; and the second valve being responsive to reduced pressure in the air-fuel mixture intake passage on complete firing of the engine, to engage the second valve seat and close off flow of supplemental air.

* * * * *